(12) United States Patent
Frank et al.

(10) Patent No.: US 6,941,394 B2
(45) Date of Patent: Sep. 6, 2005

(54) HARDWARE MODULE FOR EXTENDING TERMINALS TO FORM UNITS WITH AD-HOC NETWORK CAPABILITY

(75) Inventors: Michael Frank, Munich (DE); Ralf Rieken, Reston, VA (US)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 10/211,237

(22) Filed: Aug. 5, 2002

(65) Prior Publication Data
US 2003/0035273 A1 Feb. 20, 2003

(30) Foreign Application Priority Data
Aug. 3, 2001 (DE) .......................... 101 38 263

(51) Int. Cl.⁷ .............................................. G06F 13/12
(52) U.S. Cl. .............................. 710/62; 710/8; 710/63; 710/64; 709/217; 709/218; 703/23; 703/24
(58) Field of Search ................................ 710/8, 62–64; 709/217, 218; 703/23, 24–25; 701/45–47

(56) References Cited

U.S. PATENT DOCUMENTS 5,619,500 A * 4/1997 Hiekali ........................ 370/414
6,217,351 B1 * 4/2001 Fung et al. ................... 439/131
6,507,810 B2 * 1/2003 Razavi et al. .................. 703/24
6,643,574 B1 * 11/2003 Swart et al. ................... 701/45
6,792,466 B1 * 9/2004 Saulpaugh et al. ......... 709/229

OTHER PUBLICATIONS

Peimong, "Geistreiche Verbindungen, Intelligence Geräte in dezentralen Netzen", c't 20/1998, pp. 198–202.

"JINI Architectural Overview", Technical White Paper, Sun Microsystems, USA, 1999, pp. 11–20.

* cited by examiner

Primary Examiner—Jeffrey Gaffin
Assistant Examiner—Mike Nguyen
(74) Attorney, Agent, or Firm—Staas & Halsey LLP

(57) ABSTRACT

A hardware module for incorporating an electronic unit into an ad-hoc network has a unit to operate a Java virtual machine which supports Java RMI and Jini. The hardware module has at least one interface to a communications interface on the electronic unit. Jini services are generated with interface stubs for the hardware of the electronic unit. The hardware module has at least one interface to a local area network.

15 Claims, 1 Drawing Sheet

HARDWARE MODULE FOR EXTENDING TERMINALS TO FORM UNITS WITH AD-HOC NETWORK CAPABILITY

CROSS REFERENCE TO RELATED APPLICATIONS

This application is based on and hereby claims priority to German Application No. 101 382 634 filed on Aug. 3, 2001, the contents of which are hereby incorporated by reference.

BACKGROUND OF THE INVENTION

The invention relates to a hardware module for incorporating electronic units into an ad-hoc network.

It is known that networks are nowadays generally administered centrally. If a new network element is added, then it is necessary to ensure that it "agrees" with the already existing network elements, that is to say that it has the correct interface to the network and has the correct drivers. One step in developing the networks is therefore further development of "plug & play" in the form of "ad-hoc networks". A description of this novel network type, which is certain to become increasing significant in the future, can be found, by way of example, in the article "Geistreiche Verbindungen, Intelligente Geräte in dezentralen Netzen". One specific form of an ad-hoc network is the Jini™, whose architecture and mechanisms are described in the technical white paper "Jini™ Architectural Overview" from Sun Microsystems. The content of the disclosure of this publication, particularly with respect to the development of Jini™ Middleware, is hereby included in the content of the disclosure of this application.

Ad-hoc networks, such as the Jini™ one, are distinguished in that network elements, and hence also the services they provide, can be added to a network and removed therefrom again as desired.

In this context, services are understood generally to mean an entity which can be used by a person, by a program or by another service. They can be hardware, software, filters, a communications channel, storage space and much more. To perform a commission, many individual services may be needed.

Central control is undertaken by "blackboards". Network elements can notify the blackboard of their existence and of their capabilities and can search for services which can afford capabilities. For using the services, a leasing mechanism is provided; in this case, a period of use is arranged between the entities involved, after whose expiry the resources of the service used are released again.

Services can communicate using Java Remote Method Invocation (RMI).

The problem of the prior art is now that, although common items of hardware, such as PDAs, digital cameras, notebooks or mobiles, generally have external interfaces, they are not able to process the Jini mechanisms and hence also cannot be readily incorporated into local area ad-hoc networks.

SUMMARY OF THE INVENTION

It is therefore an object of the invention to present a hardware module which allows the existing electronic units to be incorporated into a local area ad-hoc network using their own local interface, without themselves processing Jini mechanisms.

In accordance with the inventive concept, the inventors propose a hardware module for incorporating an electronic unit into an ad-hoc network which has a means for operating a Java virtual machine which supports Java RMI and Jini, at least one interface to a communications interface on the electronic unit, means for generating Jini services with interface stubs for the hardware of the electronic unit, and at least one interface to a local area network.

In contrast to the classical proxy approach, the invention thus solves the problem of connecting terminals which cannot support Jini per se by means of generic hardware using simple plug-and-play, by virtue of already existing generic interfaces to the electronic units being combined with the requirements of Jini middleware in new hardware.

One advantageous form of the inventive hardware module provides for a lookup service to be included which can be activated using a switch on the hardware module in order to set up the connection to a local area network. A lookup service is a Jini service associated with the blackboard which is designed as a central bootstrapping mechanism and, in this regard, is used to establish contact between a network user and the network. This is described in detail in "Jini™ Architectural Overview, technical white paper from SUN Microsystems, for example.

Advantageous refinements of the hardware module propose that the interface to the communications interface on the connected electronic unit be designed to be compatible with various interfaces, such as with a USB interface, for application in the PC area, with an HAVi interface, for integrating audio/video units, or with an Instabus interface, in order to allow integration into building automation.

The invention also proposes interfaces to telecommunications terminals which support the known AT command set.

Another variant can involve the interface being designed to be compatible with the PCMCIA standard or else being compatible with a SIM card.

In another embodiment of the inventive hardware module, the inventors propose that the interface to the local area network can be both in wireless form and designed to use DC coupling. DC coupling can involve, by way of example, connection to a local Ethernet or to other physical local area networks, such as in token ring or ATM networks. On the other hand, it is possible to set up an infrared link using an IrDa interface, or a local radio link using a Bluetooth interface or an IEEE 802.11 WLAN interface, to a local area network.

The invention is explained in more detail below using a preferred exemplary embodiment with reference to the single FIG. 1.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
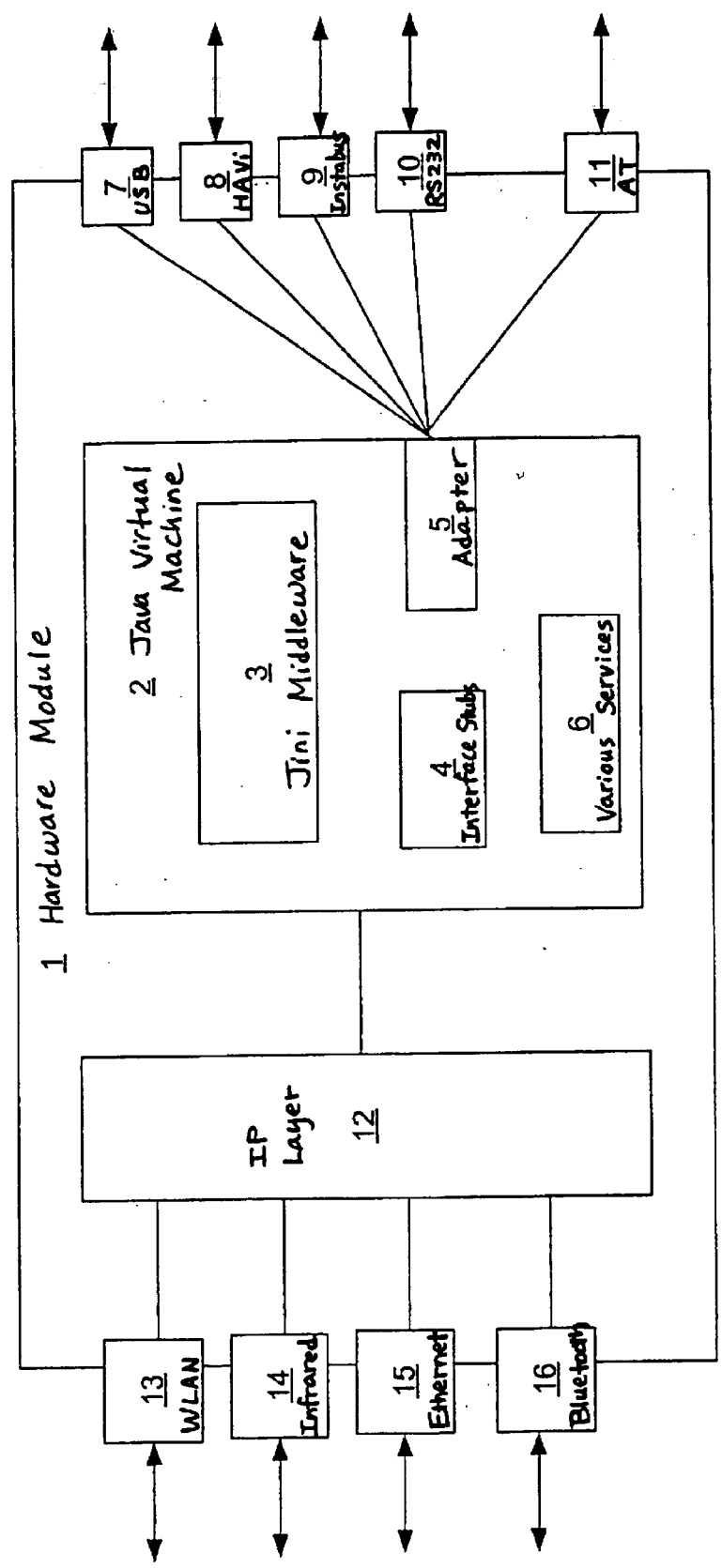
FIG. 1 shows an inventive hardware module for incorporation into an ad-hoc network.

Reference will now be made in detail to the preferred embodiments of the present invention, examples of which are illustrated in the accompanying drawings, wherein like reference numerals refer to like elements throughout.

FIG. 1 is a schematic illustration of an inventive hardware module 1 which has, on the right-hand side, the interfaces shown by way of example for electronic units. The interface 7 is a USB connection, while the interface 8 is an HAVi connection for an audio/video unit. Below that, the reference numeral 9 is used to show an Instabus for building automation, and below that a simple, universal RS232 interface 10 is shown. At the very bottom, an interface 11 to a telecommunications terminal with an AT command set is shown. The information transfer via the interfaces 7 to 11 is passed to the Java virtual machine 2, which contains an adapter 5 with connected interface stubs. Embedded in the Java virtual machine 2 is the known Jini Middleware 3, which uses an IP layer 12 to produce the connection between the interfaces 13 to 16 arranged on the left-hand side and the interfaces 7 to 11 arranged on the right-hand side.

By way of example, the interfaces 13 to 16 to a local area network, which are shown on the left, are a WLAN interface 13, an infrared interface 14, an Ethernet interface 15 and a Bluetooth interface 16. The particular advantage of using WLAN as a "transport layer" for ad-hoc networks is that the units can spontaneously meet only in a radio radius, and hence the local contact range is limited to the network.

It goes without saying that the features of the invention which are mentioned above can be used not just in the respectively indicated combination, but also in other combinations or separately, without departing from the scope of the invention.

The invention has been described in detail with particular reference to preferred embodiments thereof and examples, but it will be understood that variations and modifications can be effected within the spirit and scope of the invention.

What is claimed is:

1. A hardware module for incorporating an electronic unit into an ad-hoc local area network, the electronic unit having hardware and a communications interface, comprising:

a Java virtual machine which supports Java RMI and Jini;

at least one interface module to connect to the communications interface on the electronic unit;

interface stubs to interface with the hardware of the electronic unit;

a service generator to generate Jini services for the hardware of the electronic unit using the interface stubs; and at least one interface to the local area networks, wherein the electronic unit does not have Jini capabilities.

2. The hardware module as claimed in claim 1, wherein a lookup service is provided which can be activated using a switch on the hardware module in order to set up the connection to the local area network.

3. The hardware module as claimed in claim 1, wherein the interface module includes at least a USB interface.

4. The hardware module as claimed in claim 1, wherein the Interface module includes at least an HAVi interface.

5. The hardware module as claimed in claim 1, wherein the interface module includes at least an Instabus interface.

6. The hardware module as claim 1, wherein the interface module includes at least a tele-communicating terminal interface which supports the AT command.

7. The hardware module as claimed in claim 1, wherein the interface module includes at least a PCMCIA interface.

8. The hardware module as claimed in claim 1, wherein the interface module includes at least a SIM card interface.

9. The hardware module as claimed in claim 1, wherein the interface to the local area network is a wireless interface.

10. The hardware module as claimed in claim 1, wherein the interface to the local area network is a DC coupling interface.

11. The hardware module as claimed in claim 1, wherein the interface to the local area network is an IrDa interface.

12. The hardware module as claimed in claim 1, wherein the interface to the local area network is a Bluetooth interface.

13. The hardware module as claimed in claim 1, wherein the interface to the local area network is an IEEE 802.11 WLAN interface.

14. A hardware module for incorporating an electronic unit into an ad-hoc local area network, the electronic unit having a communications interface, comprising:

a plurality of different interfaces to connect with the communications interface of the electronic unit;

a Java virtual machine adapted to support Java RMI and Jini;

interface stubs;

an interface adapter to connect one of the interfaces to the Java virtual machine such that Jini services are provided to the electronic unit through the interface stubs; and a plurality of different interfaces to the local area network provided such that one of the interfaces can be connected to the Java virtual machine wherein the electronic unit does not have Jini capabilities.

15. A hardware module for incorporating an electronic unit into an ad-hoc local area network, the electronic unit having hardware and a communications interface, comprising:

means for operating a Java virtual machine which supports Java RMI and Jini;

at least one interface module to connect to the communications interface on the electronic unit;

means for generating Jini services with interface stubs for the hardware of the electronic unit; and at least one interface to the local area network, wherein the electronic unit does not have Jini capabilities.

* * * * *